United States Patent [19]
Wilmot

[11] 3,825,350
[45] July 23, 1974

[54] RADIATION SENSING SYSTEM
[75] Inventor: Donald W. Wilmot, Nashua, N.H.
[73] Assignee: Itek Corporation, Lexington, Mass.
[22] Filed: Dec. 29, 1972
[21] Appl. No.: 319,429

[52] U.S. Cl. .............................. 356/138, 356/153
[51] Int. Cl. ..................................... G01b 11/26
[58] Field of Search .................... 356/138, 186, 153

[56] References Cited
UNITED STATES PATENTS

| | | | |
|---|---|---|---|
| 3,627,918 | 12/1971 | Redpath | 356/167 |
| 3,636,254 | 1/1972 | Johnston | 356/167 |
| 3,697,152 | 10/1972 | Adams et al. | 350/158 |

OTHER PUBLICATIONS

Neal & Smithgall, Integrated Flying Spot Color Slide Scanners & TV Receiver, IEEE, Trans. BTR-16, No. 1, Feb. 70, pp. 56-62.

*Primary Examiner*—Ronald L. Wibert
*Assistant Examiner*—Paul K. Goodwin
*Attorney, Agent, or Firm*—Homer O. Blair; Robert L. Nathans; William C. Roch

[57] ABSTRACT

A system for detecting and providing positional information on a source of monochromatic radiation at a given wavelength of interest. The system includes an angle sensitive detection subsystem, which varies its response as a function of angle of incidence of incident radiation, and an angle insensitive detection subsystem which has a uniform response for differing angles of incidence of incident radiation. The system utilizes a dielectric filter tuned to the given wavelength of interest which has the characteristic of varying its spectral filtering response as a function of the angle of incidence of radiation. In the angle insensitive subsystem an optical system gathers radiation from the field of view and passes it at a substantially perpendicular angle through a first portion of the dielectric filter for detection by a first detector. In the angle sensitive subsystem radiation from the entire field of view is directed through a second portion of the dielectric filter at varying angles of incidence depending upon the position of each source of radiation in the field of view for detection by a second detector. A differential amplifier compares the outputs of the two photodetectors. The magnitude of the difference between the two photodetector signals will vary monotonically as the source of radiation is positioned at angles further from a perpendicular to the dielectric filter, and accordingly the signal may be used for providing positional information on the source. Also, because of the characteristics of a dielectric filter, the first and second detectors will produce equal output signals for broad frequency band sources of radiation and accordingly the output of the differential amplifier will be zero for those sources.

5 Claims, 2 Drawing Figures

RADIATION SENSING SYSTEM

BACKGROUND OF THE INVENTION

The present invention relates generally to a system for detecting or tracking radiation from a source of monochromatic radiation such as a laser beam.

In the fields of laser detection and tracking systems, it has been the general practice to employ a narrow band filter having its frequency response centered about the frequency of a laser of interest. It is possible that these systems may have been "confused" by broad band sources of radiation, such as the sun, which encompass the frequency of interest. It would be desirable to have a system for detecting radiation from a source of substantially monochromatic radiation, such as a laser, and which is not confused by radiation from a broad frequency band source of radiation such as the sun.

Also, traditional prior art tracking and position sensing systems typically use a lens system which performs a transform of data from angle in object space to linear position in image space. A detector or plurality of detectors are utilized to detect the position in image space. It would be desirable to have a nonimaging position sensing system which performs a direct transform of positions in object space to an output signal. It would also be desirable to have such a system which utilizes a minimum number of detectors to generate the positional information.

SUMMARY OF THE INVENTION

In accordance with a preferred embodiment, a system is disclosed for generating positional information on a source of radiation. The system includes an angle sensitive detection means which varies its response as a function of the angle of incidence of incident radiation, and an angle insensitive detection means which produces a substantially uniform response for differing angles of incidence of incident radiation. The responses of the angle sensitive detection means and the angle insensitive detection means are compared to produce an output signal which provides positional information on the detected source of radiation.

Also, in accordance with a second aspect of the preferred embodiment, a system is disclosed for detecting incident radiation from a source of substantially monochromatic radiation. The system utilizes an angle sensitive filter which has the characteristic of varying its spectral filtering response as a function of angle of incidence of radiation. An optical means substantially collimates radiation from over the field of view for passage through a first portion of the filter while substantially perpendicular to it. A second portion of the filter is allowed to receive radiation from the field of view at varying angles of incidence depending upon the position of each source of radiation in the field of view. A first detector detects the radiation passed through the first filter portion while substantially perpendicular to it, and a second detector detects radiation passed through the second filter portion at varying angles of incidence. The outputs of the first and second detectors are compared, and an output signal is produced which is indicative of the detection of radiation from a source of substantially monochromatic radiation.

BRIEF DESCRIPTION OF A PREFERRED EMBODIMENT

DESCRIPTION OF A PREFERRED EMBODIMENT

Figure 1:
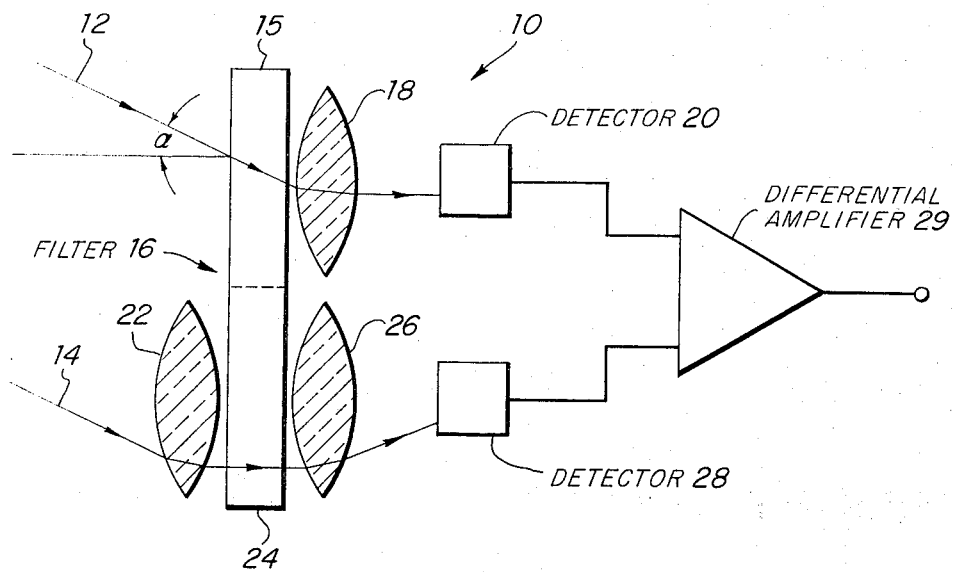
FIG. 1 illustrates a preferred embodiment of this invention for detecting and/or providing positional information on a monochromatic source of radiation.

FIG. 1 illustrates one embodiment of a system 10 for detecting and/or providing positional information on a source of monochromatic radiation at a given wavelength of interest. Radiation illustrated at 12 and 14 which emanates from a common source of radiation, is incident on the system 10. Radiation at 12 is incident on an angle sensitive subsystem which varies its response as a function of the angle of incidence of the radiation. The radiation at 12 is directly incident at an angle of incidence upon a first portion 15 of a dielectric filter 16 tuned for the sake of this illustration to the frequency of the incoming radiation. The radiation passes through the filter, and is directed by a condensing optical system 18 onto a first detector 20. Radiation at 14 is incident on an angle insensitive subsystem which has a uniform response for differing angles of incidence of the radiation. The radiation at 14 is incident on an optical system, illustrated schematically at 22, which bends the ray 14 for passage through a second portion 24 of the interference filter 16 while substantially perpendicular to it (at a zero angle of incidence). The ray 14 then passes into a condensing optical system 26 which directs the radiation onto a second detector 28. The signals from detectors 20 and 28 are then compared in a differential amplifier 29 which produces an output signal the magnitude of which is proportional to the difference between the input signals.

The optical systems 22 and 26 may take the form of the optical systems illustrated in U.S. Pat. application No. 224,047 for LASER DETECTION SYSTEM, filed Feb. 7, 1972 now U.S. Pat. No. 3,761,184. That patent application illustrates a lens system which may be utilized in the present invention and which has a number of advantages over the prior art. Other lens systems might be utilized in other embodiments. An important consideration in the choice of lens system 22 is that it should receive radiation over a desired field of view and substantially collimate the radiation for passage through the interference filter while substantially perpendicular to it. The lens systems illustrated at 18 and 26 may be omitted in particular embodiments depending upon the characteristics of the detectors 20 and 28. If the detectors 20 and 28 have sufficiently large areas to encompass the area of the filter and also have a sufficiently large acceptance angle to accept radiation within the design of the system, then the lens systems 18 and 28 might be omitted. In the illustrated embodiment lens systems 18 and 26 allow detectors to be utilized which have a smaller area and smaller acceptance angles.

Figure 2:
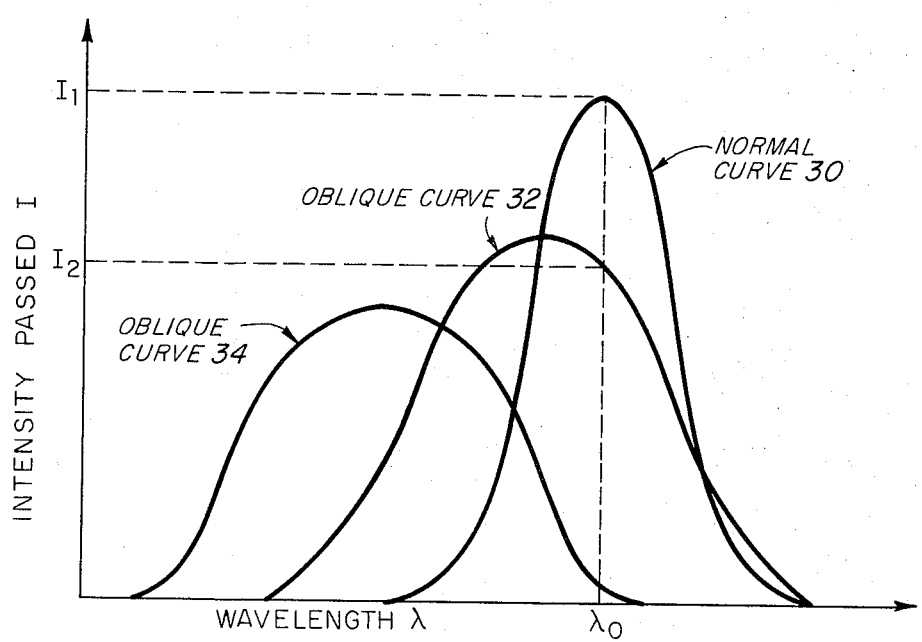
FIG. 2 illustrates a curve of intensity of radiation passed versus wavelength for radiation incident upon a dielectric filter at a normal angle, and also curves of the same characteristics for radiation received at two other angles not normal to the dielectric filter.

Reference should now be made to FIG. 2 for a more complete understanding of the operation of this invention. FIG. 2 illustrates characteristic curves of radiation passed versus wavelength for a typical dielectric filter.

The present state of the art requires that a system designed to detect a narrow band of radiation with high rejection ratios be built with an interference dielectric filter. The spectral content of radiation passed by a dielectric filter depends upon the angle of incidence of the radiation on the filter. As illustrated by curve 30, radiation incident on an interference filter at a normal angle enables the filter to pass the highest intensity of radiation with the highest rejection ratios. As radiation is incident on the filter at other than a normal angle, the curve shifts to a shorter wavelength and tends to broaden its base while passing less radiation. The curve 32 is for one particular small angle of incidence while the curve 34 is for one particular larger angle of incidence. For other angles of incidence the curves are similar with the general characteristic that as the angle of incidence increases the base tends to broaden and less radiation is passed.

FIG. 2 illustrates another characteristic of interference filters, mainly that even though the response curves differ for differing angles of incidence the areas under each curve tend to be relatively constant (response widens and intensity decreases for oblique incidence). Thus, if the system of FIG. 1 were illuminated by a broad frequency band of radiation at the angle of incidence for which curve 32 is drawn, the first filter section 15 would pass an amount of radiation equal to the area under curve 32 while the second filter section 24 would pass an amount of radiation equal to the area under the curve 30. Since the areas defined by these two curves are substantially equal, the responses of photodetectors 20 and 28 will be substantially equal, and the output of differential amplifier 29 will be zero. Accordingly, the system illustrated in FIG. 1 is designed to produce no output signal when it is illuminated by a broad band source of radiation and to produce an output signal when it is illuminated by a source of monochromatic radiation such as a laser.

The system of FIG. 1 may also be utilized as a tracking system for yielding positional information on the detected source of radiation. Referring to FIG. 2, if a source of substantially monochromatic radiation at wavelength λ illuminates the system, the second filter portion 24 will pass radiation with an intensity $I_1$ while the first filter portion 15 will pass radiation with an intensity $I_2$. The differential amplifier 29 will produce an output signal proportional to the difference between intensities $I_1$ and $I_2$. If radiation were received at an angle of incidence less than the angle of incidence for which curve 32 is drawn, the curve for that particular angle would be somewhere between curves 30 and 32. Accordingly, the difference in the intensities passed would be less and also the magnitude of the signal from differential amplifier 29 would be less. Conversely, if the angle of incidence of radiation were greater than the angle of incidence for which curve 32 is drawn, the difference in the intensities passed would be greater and also the magnitude of the signal from differential amplifier 29 would be greater. Accordingly, the magnitude of the difference between the intensities passed is proportional to the angle of incidence. The magnitude of the difference gives no information on the relative direction of the angle of incidence relative to a perpendicular from the dielectric filter. In some systems, information on the relative direction is not required. In other systems it might be required. Complete directional information might be obtained by utilizing a plurality of systems as illustrated in FIG. 1 with each system being pointed in a different direction. By comparing the outputs from the plurality of systems, the direction of the source of radiation may be determined fairly accurately. Alternatively, one system as illustrated in FIG. 1 might be utilized, but instead of utilizing a directionally fixed system, the direction of the system might be nutated along a conical path to supply more information on the direction of the detected radiation source.

While the preferred embodiment illustrates a system which utilizes an interference filter for both the angle sensitive subsystem and the angle insensitive subsystem, other embodiments might utilize other arrangements for these subsystems. For instance, in one embodiment, the angle insensitive subsystem might utilize an absorption filter having an absorption line at the appropriate wavelength. An absorption filter is an angle insensitive filter, and accordingly would not require the collimation optics shown in the preferred embodiment. Also, while FIG. 1 illustrates an embodiment wherein one interference filter has first and second portions, alternative embodiments might utilize two separate interference filters having similar characteristics. Also, while the preferred embodiment illustrates a system having an interference filter centered at the frequency of interest, other embodiments might be utilized which have the interference filter centered at a frequency other than the particular frequency of interest.

While several embodiments have been described, the teachings of this invention will suggest many other embodiments to those skilled in the art.

I claim:

1. A system for generating positional information on a source of radiation within a given field of view and comprising:
   a. an angle sensitive detection means for detecting radiation from said field of view and having the characteristic of varying its response as a function of angle of incidence of incident radiation;
   b. an angle insensitive detection means for detecting radiation from said field of view and having the characteristic of producing a substantially uniform response for differing angles of incidence of incident radiation; and
   c. means for comparing the responses of said angle sensitive detection means and said angle insensitive detection means and for producing an output signal providing positional information on the detected source of radiation.

2. A system as set forth in claim 1 wherein said angle sensitive detection means includes a first dielectric filter means positioned to receive radiation from said given field of view at varying angles of incidence according to the position of each source of radiation in said given field of view; and
   b. said angle insensitive means includes a second dielectric filter means having a response characteristic similar to said first dielectric filter means, and an optical means for directing incident radiation received from said given field of view at a substantially perpendicular angle against said second dielectric filter means.

3. A system for detecting incident radiation from a source of substantially monochromatic radiation over a given field of view while disregarding incident radiation from broad frequency band sources of radiation and comprising:
   a. an angle sensitive filter means having the characteristic of varying its spectral filtering response as a function of angle of incidence of incident radiation, said filter means having first and second portions;
   b. an optical means for substantially collimating incident radiation received from said given field of view and passing the substantially collimated radiation through said first portion of said filter means substantially perpendicular to said filter means;
   c. means for allowing said second portion of said filter means to receive radiation from said given field of view at varying angles of incidence according to the position of each source of radiation in said given field of view;
   d. a first detector means for detecting radiation passed through said first portion of said filter means;
   e. a second detector means for detecting radiation passed through said second portion of said filter means; and
   f. means for comparing the outputs of said first and second detector and for producing an output signal indicative of the detection of incident radiation from a source of substantially monochromatic radiation.

4. A system as set forth in claim 3 wherein the system is utilized to produce positional information on a detected source of substantially monochromatic radiation and wherein said comparing means includes means for determining the magnitude of the difference between the outputs of said first and second detector means.

5. A system as set forth in claim 3 wherein said angle sensitive filter means includes a dielectric filter means.

* * * * *